(12) United States Patent
Cortright et al.

(10) Patent No.: US 7,660,809 B2
(45) Date of Patent: Feb. 9, 2010

(54) USING A FILE SERVER AS A CENTRAL SHARED DATABASE

(75) Inventors: David S. Cortright, Los Altos, CA (US); James C. Grandy, Menlo Park, CA (US); Daniel W. Crevier, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 11/048,447

(22) Filed: Jan. 31, 2005

(65) Prior Publication Data

US 2006/0173932 A1    Aug. 3, 2006

(51) Int. Cl.
G06F 17/00 (2006.01)

(52) U.S. Cl. .................. 707/102; 707/101; 707/100

(58) Field of Classification Search .......... 707/100–102
See application file for complete search history.

(56) References Cited

U.S. PATENT DOCUMENTS

| | | | |
|---|---|---|---|
| 7,100,195 B1 * | 8/2006 | Underwood | 726/2 |
| 7,213,227 B2 * | 5/2007 | Kompalli et al. | 717/108 |
| 2002/0087704 A1 * | 7/2002 | Chesnais et al. | 709/228 |
| 2005/0078088 A1 * | 4/2005 | Davis et al. | 345/163 |
| 2005/0091673 A1 * | 4/2005 | Rhoten et al. | 719/329 |
| 2006/0041603 A1 * | 2/2006 | Paterson et al. | 707/204 |

* cited by examiner

Primary Examiner—Sana Al-Hashemi
(74) Attorney, Agent, or Firm—Vierra Magen Marcus & DeNiro LLP

(57) ABSTRACT

Various entities need to share data among team members working on the same project without investing in specialized server software. To address this need, an existing standard file server is used to host data for sharing among the team. The file server has not been customized to share the data for the particular application. A user creates a special folder for a project at a user specified location on the file server. Data associated with the project is converted to files and stored in a structure of folders used by the file server to represent the data that is shared. Each client that has subscribed to this shared data synchronizes the data on their local computing device with the data on the file server. Security is provided by using the file server's built-in access controls.

8 Claims, 7 Drawing Sheets

| KEY | VALUE |
|---|---|
| Project GUID | 36 character |
| Shared Flag | True/False |
| Version | string |
| Category Name | string |
| Project Name | string |
| Project Comments | string |
| Project Color | string |
| Project End Dtae | string |

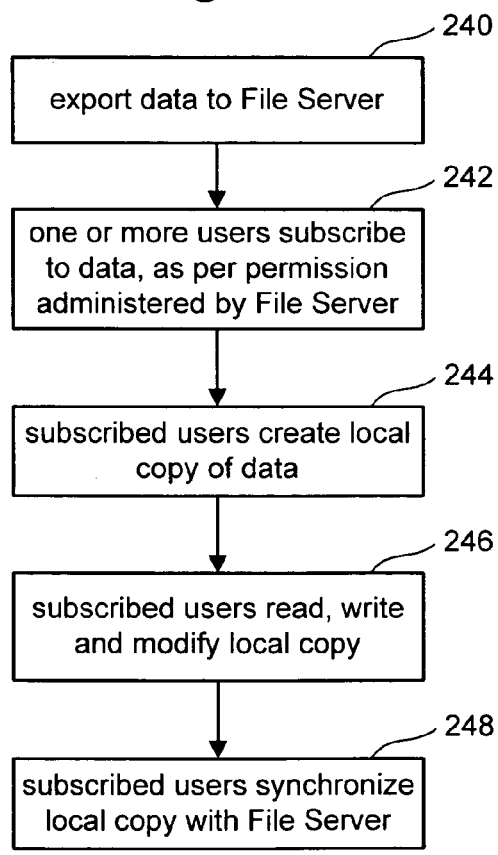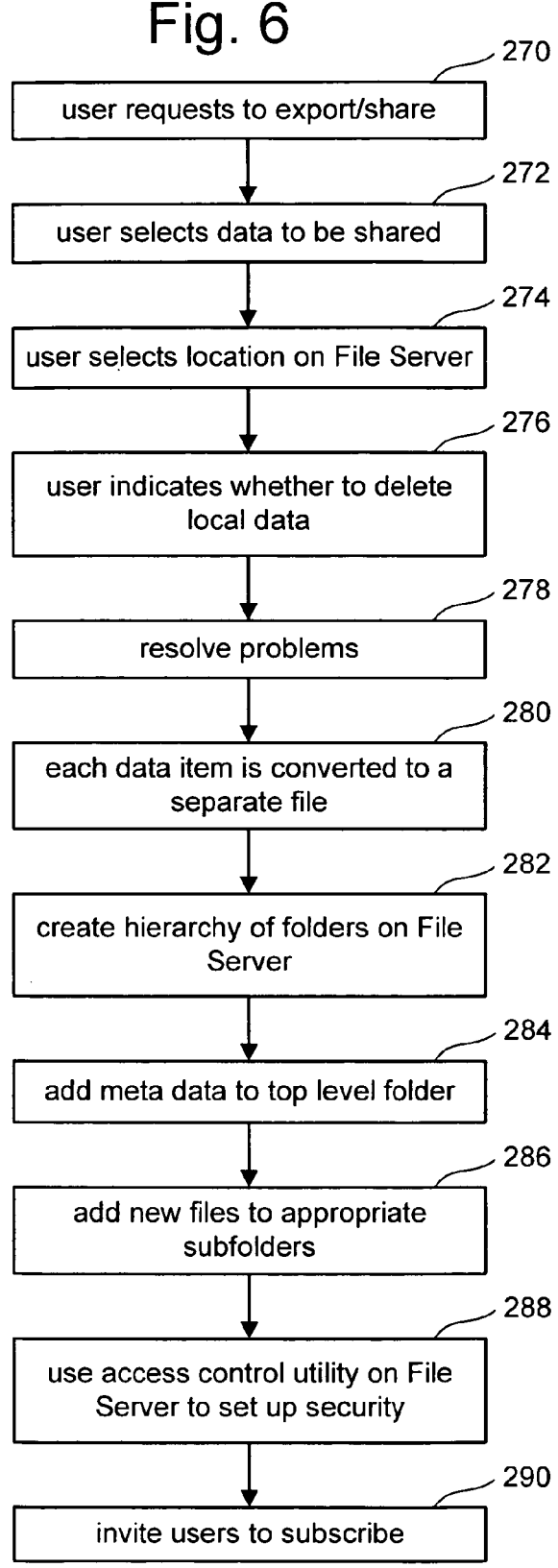

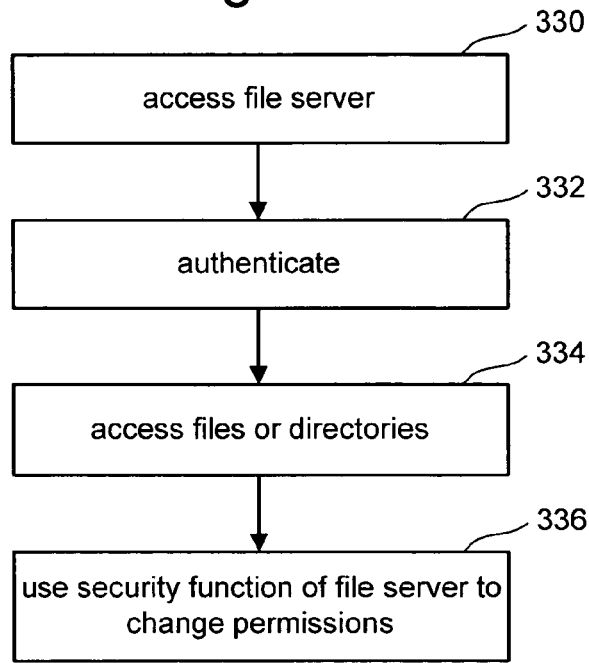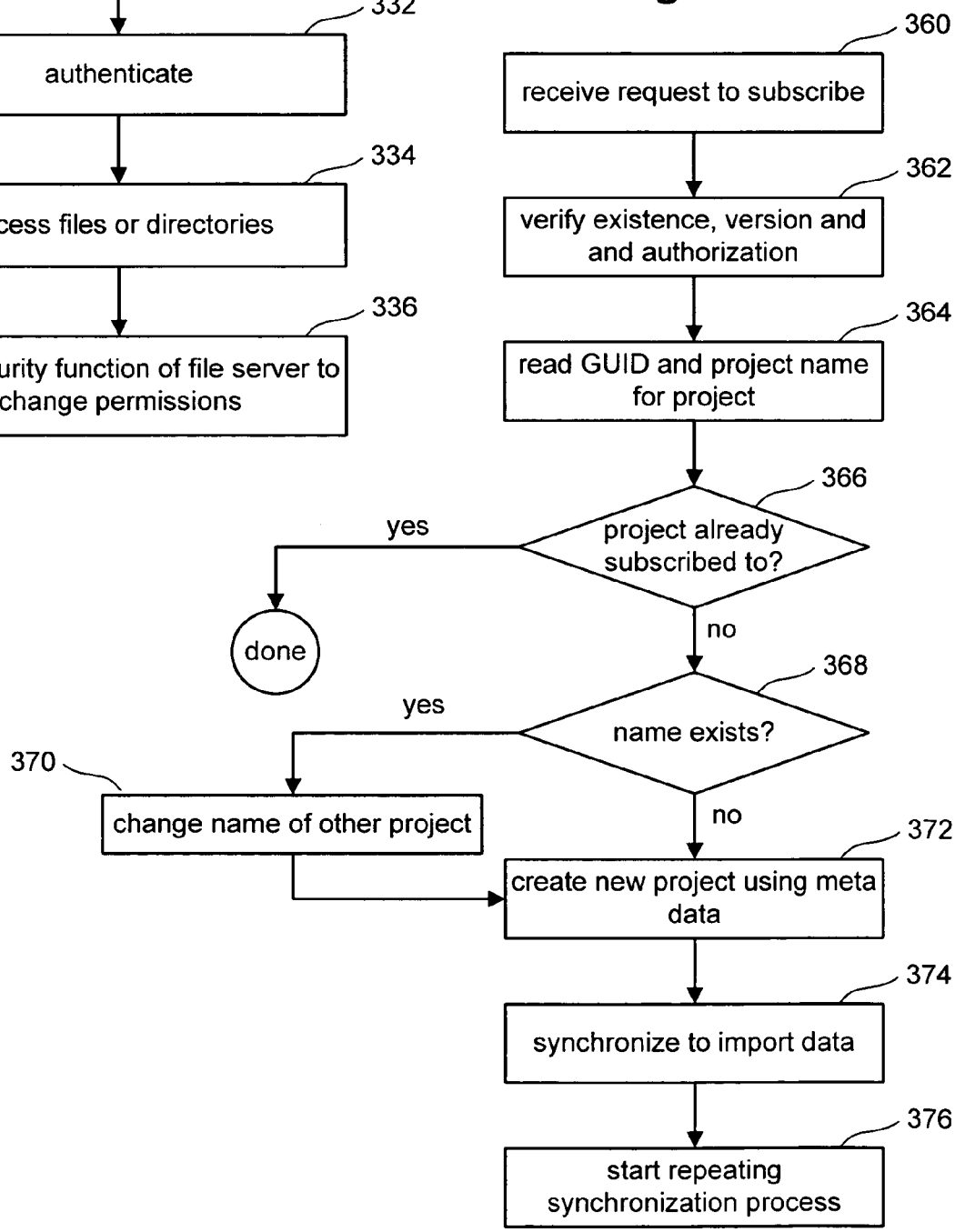

| GUID1 | Last Sync Date 1 | Hash 1 |
| GUID2 | Last Sync Date 2 | Hash 2 |
| ... | ... | ... |

USING A FILE SERVER AS A CENTRAL SHARED DATABASE

BACKGROUND OF THE INVENTION

1. Field of the Invention

The present invention relates to technology for storing and accessing data in a database-like store using files in a standard file system 2. Description of the Related Art Computers are common in many workplaces. Employees use computers to perform many facets of their jobs. To increase productivity, groups of people who work together want to share data. For example, when working on a project, various member of the project team may store information as contacts, calendar appointments, notes, tasks and messages associated with the project. Since more than one person can make use of these data items, it is beneficial to the team if the data is shared.

One prior solution to sharing data is to create a central data server. Any of the team members can login or otherwise communicate with the central data server to access the data. However, to share the particular the data among a team, a customized software application with a customized data repository is used. Such customized solutions can be very expensive to build and/or purchase, and may require substantial resources to maintain.

Another solution to sharing data is to use peer-to-peer sharing. For example, a project team member can connect to another project team member and share data However, this solution has its drawbacks. First, it may be difficult for one project team member to find another. Second, it may be very difficult to provide appropriate security and trust with a peer-to-peer sharing mechanism. Third, because the sharing is performed among different pairs of project team members, it may be difficult to identify the most up-to-date set of data.

Thus, a better solution for sharing data is needed.

SUMMARY OF THE INVENTION

To provide for sharing of data, an existing file server is used to host data for sharing among a team. A user creates a special folder for a project at a user specified location on the file server. Data associated with the project is converted to files and stored in a structure of folders used by the file server to represent the data that is shared. Each client that has subscribed to this shared data synchronizes the data on its computing device with the data represented on the file server. Security is provided by using the file server's built-in standard access controls.

One embodiment includes converting a set of data items from a first format specific for a first application to a set of standard format files on a file server such that each data item is in a separate file on the file server. A copy of the data items in the format specific to the first application is maintained on a first client device. The copy of the data items in the format specific to the first application is synchronized with the standard format files on the file server.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special-purpose processors. In one embodiment, software implementing the present invention is used to program one or more processors. The one or more processors can be in communication with one or more storage devices, peripherals and/or communication interfaces.

BRIEF DESCRIPTION OF THE DRAWINGS

FIG. 5 is a flow chart describing one embodiment of a process for sharing data.

FIG. 6 is a flow chart describing one embodiment of a process for exporting data.

FIG. 7 is a flow chart describing one embodiment of a process for managing access control.

FIG. 8 is a flow chart describing one embodiment of a process for subscribing to shared data.

DETAILED DESCRIPTION

Many entities wish to share data (such as contacts, calendar events, notes, tasks, etc.) among team members working on the same project without investing in specialized server software. One solution described herein utilizes the standard off-the-shelf file server, which is already up and running in the vast majority of environments. A folder is created in a user-specified location and then a structure of subfolders and files are created to represent the data objects that are to be shared. Each client subscribes to the shared data and synchronizes the data on their computer with the data represented on the file server. While one client must initially generate the folder and file structure on the file server, in one embodiment there is no concept of an owner of the data. The standard access control mechanism of the file server is used to provide access control (security) for the files on the file server.

Figure 1:
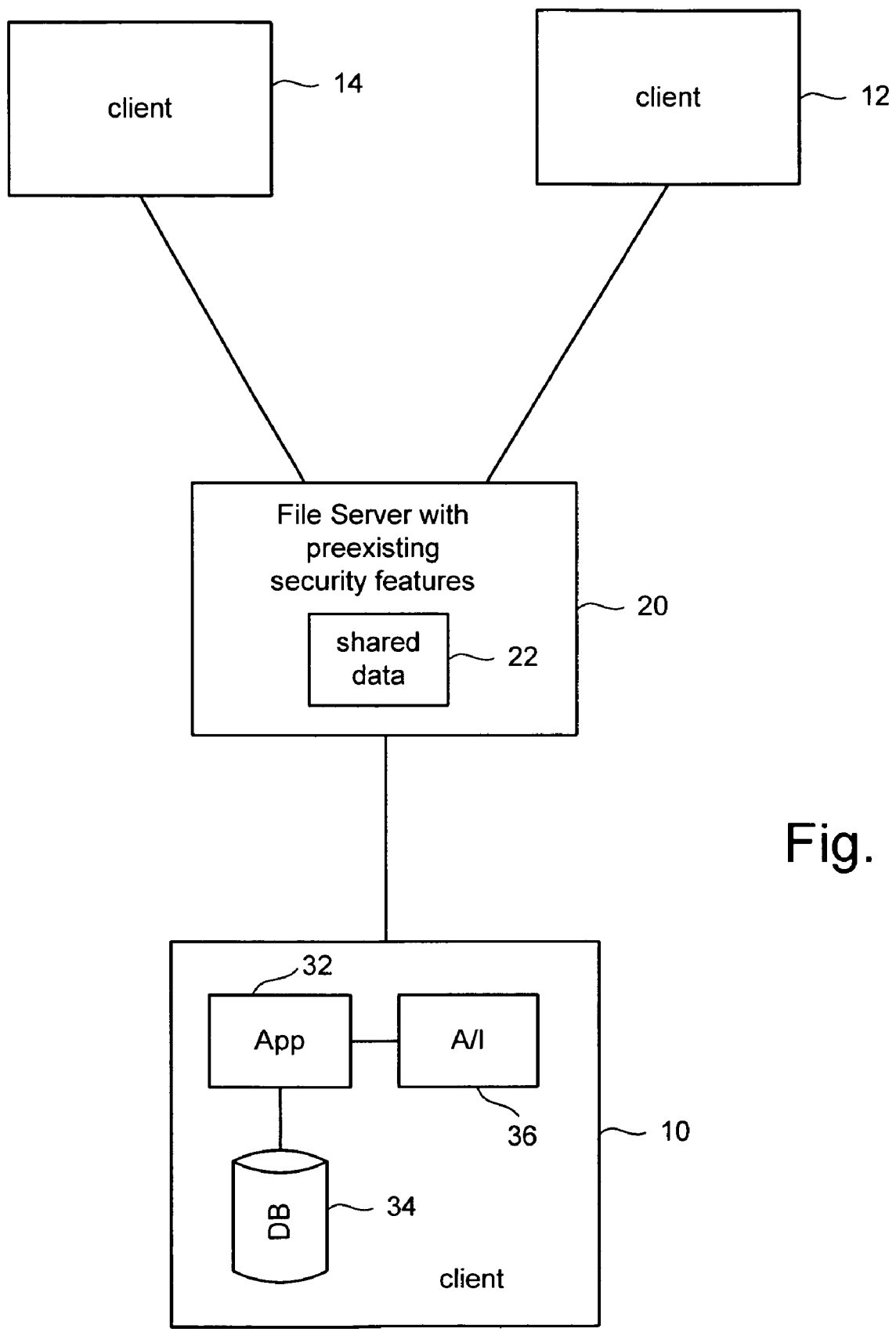
FIG. 1 is a block diagram depicting one example of a system for implementing the present invention.

FIG. 1 provides a block diagram of one embodiment of an environment that uses a shared data structure on an existing standard file server. FIG. 1 shows Clients 10, 12, and 14 in communication with File Server 20. Although FIG. 1 shows three clients, more less than three clients can be used. The clients can communicate with File Server 203 using a LAN, WAN, the Internet, or other type of network (including wireless and wired networks). In many cases, the clients are remote from the file server, but in some cases the clients may be local to the file server.

File Server 20 is a pre-existing standard file server that has not been specially designed for the application described herein. The file server will include of Shared Data 22, which can be shared amongst various clients. Shared Data 22 is stored in the standard format for the file server in a generic file system used for typical file storage.

In one embodiment, each of the clients that can access the data will have an Application running on the client. This Application will be used to read or write such data. For example, Client 10 depicts Application 32. In one embodiment, Application 32 is a personal information management software program that is used to manage various information such as contacts, appointments, notes, tasks, messages, etc. The Application can manage other information. The invention is not limited to any particular set of information. One example of a suitable application is Entourage from Microsoft Corporation. However, other applications can also be used. Application 32 is in communication with Application Database 34 which stores the various personal information associated with the user of Client 10. Client 10 includes an Archiving/Importing/Synchronizing Component 36 which is used to perform various sharing services described herein. In one embodiment, each of the clients who can access Shared Data 22 will include an Application 32, Database 34, and Archiving/Importing/Sharing Component 36. Although FIG. 1 shows Shared Data 22 on a file server accessible via network, the shared data can also be on a client machine or other computing device.

Data for Application 32 is stored in Database 34 in a format specific to Application 32. A set of this data is copied to File Server 20. This copied data is Shared Data 22. Subsequently, Clients 10, 12, and/or 14 can make a local copy of Shared Data 22, modify the local copy (add, delete, change) and then synchronize the local copy with Shared Data 22 on File Server 20.

Figures 2, 3:
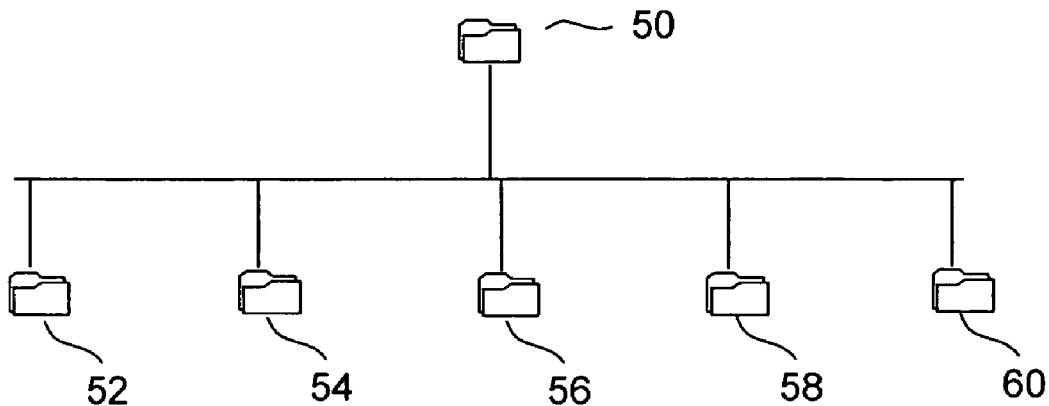
FIG. 2 is a block diagram illustrating one embodiment of a hierarchical folder structure used to store shared data.
FIG. 3 is a block diagram of one example of a meta data file.

FIG. 2 shows the structure of one embodiment of Shared Data 22. That structure will include a hierarchy of folders stored in the standard generic file system for File Server 22. In one embodiment, the hierarchy is two levels with Top Level Folder 50 and a set of subfolders 52-60. Although FIG. 2 shows five subfolders (52-60), more or less than five subfolders can be used. In other embodiments, there can be additional levels of subfolders.

In one embodiment, folder 50 is the top level folder for the shared data. Folder 50 will include subfolders and a meta data file. In one embodiment, the meta data file is an XML file. FIG. 3 is an example of the contents of the XML file. The meta data includes a set of keys and values. The example in FIG. 3 shows eight keys. The first key is Project GUID, which is a 36 character globally unique identification. In one embodiment, it is anticipated that data will be organized according to projects. Each project will be named and given a global unique identifier (the GUID). The meta data will also include a Shared Flag that indicates whether the particular project data is to be shared or not. In some embodiments, a user can archive project data to the file server, but not share it. The Version key stores an identification of the version of Application 32 used to store the data. This helps Application 32 avoid using data from an unsupported version of the software. Category Name is a string used to categorize the project. Project Name is a string that stores the name of the project. Project Comments is a string that stores various comments that the authorized users can add to describe the project. Project Color is a string that identifies a color that is used to help identify the project. Project End Date is a string that identifies the date that the project is supposed to end. Other meta data can also be stored.

As described above, Top Level Folder 50 includes a set of subfolders. In one embodiment, there is one subfolder for each type of data. For example, subfolder 52 is for messages, subfolder 54 is for contacts, subfolder 56 is for appointments, subfolder 58 is for notes, and subfolder 60 is for tasks. Within each subfolder is a set of files. In one embodiment, there is one file for each data item. That is, within contacts Subfolder 54, there is one file for each contact. Thus, if there are 200 contacts stored in Database 34 for a particular project, there may be 200 files stored in subfolder 54 for that particular project. For each message in Database 34 that is associated with the project, there will be one file stored in subfolder 52. For each appointment in Database 34 that is associated with the project, there will be one file stored in subfolder 56. For each note in Database 34 that is associated with the project, there will be one file stored in subfolder 58. For each task in Database 34 that is associated with the project, there will be one file stored in subfolder 60.

In many embodiments, the same data stored in separate files in Shared Data 22 will be stored in one database 34. When Application 32 stores various data items in Database 34, Application 32 will assign a GUID to each data item. Thus, each message will have its own GUID, each contact will have its own GUID, each appointment will have its own GUID, each note will have its own GUID, and each task will have its own GUID. When creating the files stored in the subfolders depicted in FIG. 2, the file name for each file will be generated based on the GUID. Each file name will be a twenty six character prefix followed by a suffix specific to the file type. The GUIDs used in Database 34 are 128 bit GUIDs. When creating the files stored in the subfolders of FIG. 2, Archive/Import/Synchronization Module 36 will create a twenty six character file name from the 128 bit GUID using 5 bit encoding. Encoding is performed by taking five bits of the GUID at a time and converting those five bits to an ASCII character based on a table. This table will have 26 uppercase letters and six numbers. Each set of five bits in the GUID will correspond to one of the uppercase letters or numbers in the table. After encoding all 128 bits, there will be 26 characters. These characters will make up the prefix of the file name.

When the data is stored in Database 34, the data is in a format proprietary for Application 30. However, each of the files stored in the subfolders of FIG. 2 will be in the standard format for that type of data. For example, messages will be stored in the in-box format. Thus, messages will have a suffix of .mbox. Contacts will be stored in vCard format and have a suffix of .vcf. Calendar/Appointment items will be stored in iCal format; therefore, files will have a suffix of .icf. Tasks will be stored in the iCal format. Notes will be stored using XML (in other embodiments, notes can be stored in an .ics format). In one embodiment, the folders in FIG. 2 will be stored in a .rge package. In some embodiments, the sharing technology described herein will not be used to share messages. In other embodiments, messages can be shared.

Figure 4:
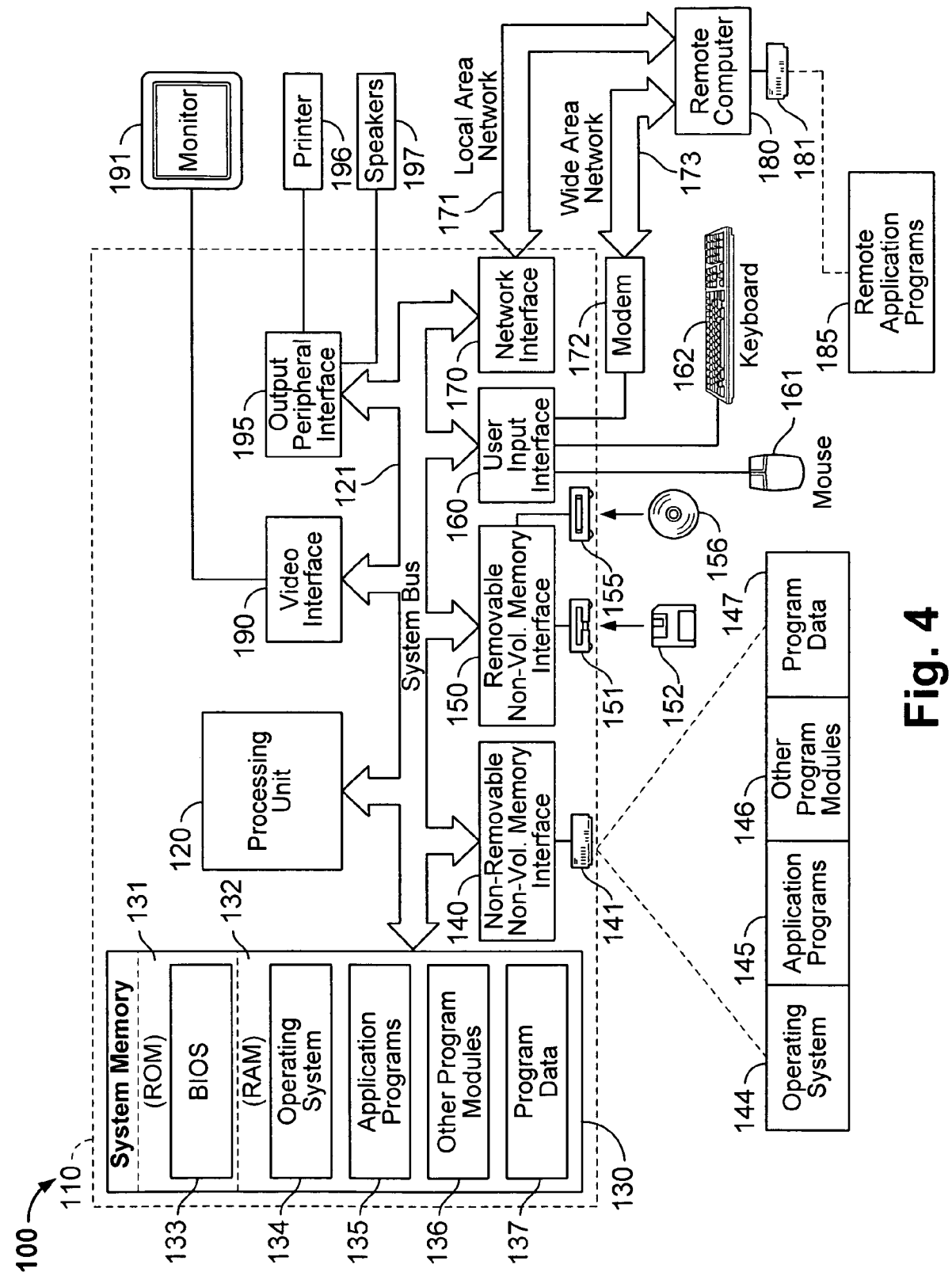
FIG. 4 is a block diagram of one example of a computing system.

FIG. 4 illustrates an example of a suitable general computing environment 100 that may be used for any of the Client devices 10, 12, or 14 as well as File Server 20. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous general purpose or special purpose computing system environments or configurations. Examples of well known computing systems, environments, and/or configurations that may be suitable for use with the invention include, but are not limited to, personal computers, server computers, hand-held devices, notebook or laptop devices, personal digital assistants, telephones (wired, wireless, or cellular), multiprocessor systems, microprocessor-based systems, set top boxes, programmable consumer electronics, network PCs, minicomputers, mainframe computers, other computing devices distributed computing environments that include any of the above systems or devices, and the like.

The invention may be described in the general context of computer-executable instructions, such as program modules, being executed by a computing device. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer/processor readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

FIG. 5 is a flowchart describing one embodiment of the overall process for sharing data, as described herein. In step 240, one of the clients will export the data for a project to File Server 20. This data will be stored on File Server 20 as Shared Data 22. In step 242, one or more clients will subscribe to the data. The ability to subscribe and share data is restricted by access controls administered by the standard access control mechanism on Filer Server 20. In step 244, users that have subscribed to Shared Data 22 will create a local copy of that data. That is, it is assumed that each client that subscribes will have its own installation of Application 32, Database 34 and Component 36. Using the local version of Archive/Import/Synchronizing Component 36, the Shared Data 22 will be copied and stored into the local copy of Database 34 for each user who subscribes. In step 246, the subscribed users can read, write to or modify the local version of Shared Data 22 that is stored in the user's local version of Database 34. In step 248, the subscribed users will synchronize their local copy of the data with the copy of Shared Data 22 on File Server 20. Although the steps to FIG. 5 are depicted to be serial, steps 242-248 can be performed in any order and concurrently for each of the various users. Thus, while one user is synchronizing, other users can be reading, writing, subscribing, etc.

FIG. 6 is a flow chart describing one embodiment for exporting Shared Data 22 in order to share that data. In step 270, the user requests to export and/or share a particular set of data. In one embodiment, step 270 includes a user choosing a menu option or other item on a user interface to indicate that user wishes to share data. In step 272, the user selects which data to be shared. In one embodiment, the user will be provided with a list of projects and user can choose one or more of those projects. Once a project is chosen, the user is provided with a list of the various types of data stored for that project (such as mail, tasks, contacts, notes, calendar events, and/or other files). The user can choose which of those types of those items to store. In another embodiment, the user will be provided with a list the actual data items and can choose specific data items to store. Some embodiments do not require data to be stored on a project basis; therefore, the user can choose the set of data to be shared. In step 274, the user is able to select a location on File Server 20 to store Shared Data 22. In step 276, user indicates whether to delete the local copy of the data. That is, after exporting the data to the shared data location, the user has the option to delete the current data stored in Database 34. In most cases, the user will elect to maintain the data in Database 34 since the user wants to share it and still be able to access it. Step 276 can be performed by providing a dialog box to the user and letting the user to check off whether to delete or not to delete local copy. In Step 278, Archive/Import/Synchronization Component 36 will resolve any problems that it finds in the data. In some embodiments, not all the data will be in a format suitable for sharing. For example, some implementations may not share graphical data. Thus, if there are images inside notes or tasks, those images will not be shared.

In step 280, each data item to be shared is converted from the proprietary format for Application 30 (stored in database 32) to a standard format for storage in a separate file on File Server 20. That is, each message is converted to its own message file, each note is converted to its own note file, each task is converted to its own task file, each appointment is converted to its own appointment file, and each contact is converted to its own contact file. In step 282, the hierarchy of folders depicted in FIG. 2 is created on File Server 20. In step 284, the meta data is added to an XML file in the Top Level Folder 50. In step 286, the new files created in step 280 are added to the appropriate subfolders 52-60. In step 288, Archive/Import/Synchronization Component 36 sets up the security settings for each of the new files using the access control utility on File Server 20. In one embodiment, all users who were previously allowed to access the data in Database 34 will be provided access on File Server 20. In other embodiments, the default will be to have the shared data available to any user. In other embodiments, a dialog box will be provided to a user of Client Device 10 so that the user can determine which entities can access Shared Data 22. There are various other ways to determine who will have and not have access to the Shared Data 22.

In one embodiment, the access control mechanism will allow an entity to select which users can access the data and what type of access each user will have. Users can be provided with read only access, read and write access, read and write and modify access, etc. In step 290, invitations can be sent to other users to subscribe to the data. For example, a dialog box can be provided to the user to select which other user to invite. For each user to invite, an e-mail address will be provided. Then an e-mail message will be sent to each of the users. The email message sent includes an attachment, which is presented to the user as a link. The link can be used to direct the appropriate local versions of Application 32 to initiate the subscription process described below. In other embodiments, the invitation to subscribe can be provided via Instant Messaging, page, voicemail, etc. In some embodiments, the invitation will not be sent out as part of the process in FIG. 6. Rather, the invitation can be sent out as part of a manual or automated process performed at a different time.

Once the Shared Data 22 is set up on File Server 20, any of the users with sufficient permissions will be able to manage the various security settings. To do so, a user will perform the process of FIG. 7. Note that the process of FIG. 7 can be performed manually by a person, or automatically by another entity. In step 330, the entity performing the management of permissions will access File Server 20. In some embodiments, the entity will be required to authenticate (including providing login credentials) in step 332 to verify that it is a user who has appropriate permissions. In step 334, the various files and directories of Shared Data 22 will be accessed. In step 336, the existing standard security functions of File Server 20 will be used to view and/or change permissions for any of the files or directories of Shared Data 22. No special security component is created for the sharing technology. For example, in a Microsoft Windows XP environment, a user can right click on a File or Directory, click on the Properties selection, click on the Security tab, and be able to change security settings. These changes can include adding new users and changing permission settings for existing users. Examples for permission settings allow remote control, modify privileges, read privileges, write privileges and other permissions that are appropriate for the particular implementation. Note that the clients and file server can utilize the same or different platforms, environments and/or operating systems.

After Shared Data 22 is properly set up on File Server 20, any user with appropriate permissions can subscribe to Shared Data 22. FIG. 8 is a flow chart describing one embodiment of a process for subscribing. The process of FIG. 8 is performed by Archive/Import/Synchronization Component 36 of the respective client. In step 360, the local version of Application 32 receives a request to subscribe. This request to subscribe can be performed by a link within the e-mail invitation. Alternatively, a menu option within Application 32 can be used to select the request to subscribe. The request to subscribe to data will include an identification of the data. For example, the location and name of the Shared Data 22. In step 362, the system will verify the existence of the shared data, verify that the version of the data is appropriate in light of the version of Application 32 and verify that the user requesting a subscription is authorized. The verification of authorization is based on the permissions and access control utility of File Server 20. If the data does not exist, or the version is inappropriate or the user is unauthorized, then the process of FIG. 8 would not proceed after step 362. If the data does exist, the version is appropriate and the user is authorized, then the system will read the GUID and the Project Name from the meta data (see FIG. 3) for Shared Data 22. In step 366, the system determines whether the project has already been subscribed to. This is done by determining whether the GUID is already assigned to a project within the local Database 34. If so, the process of FIG. 8 is complete because there is no reason to re-subscribe.

If the project has not already been subscribed to, then in step 368 the system determines whether the Project Name already exists for another project. That is, the system will search all the projects in Database 34 to determine whether there is another project with the same project name but a different GUID. If so, in step 370 the system will change the Project Name for the project that already exists in the local Database 34. If the name does not already exist, then a new project is created using the meta data in step 372. Note that after changing the name in step 370, step 372 will also be performed. After step 372, the new project is created in Database 34 and the system is ready to receive the data for that project. In step 374, the system will synchronize the data in local Database 34 with the data stored in Shared Data 22. Since the project was just created, there will be no data for that project in Database 34 and, thus, the synchronization process will simply copy all the data from Shared Data 22 into Local Database 34. This copying process will include reading all the files and converting the contents of the files into the appropriate data objects for Application 32. More detail about synchronization is provided below in FIG. 10. In step 376, a repeating synchronization process is started. More details about step 376 are provided below. Note that discussion above assumes that the Shared Data 22 will be for a particular project. In other embodiments, however, shared data does not have to be accumulated on a project basis. Thus, the present invention can be performed on data that is not aggregated for a project.

Figures 9, 11:
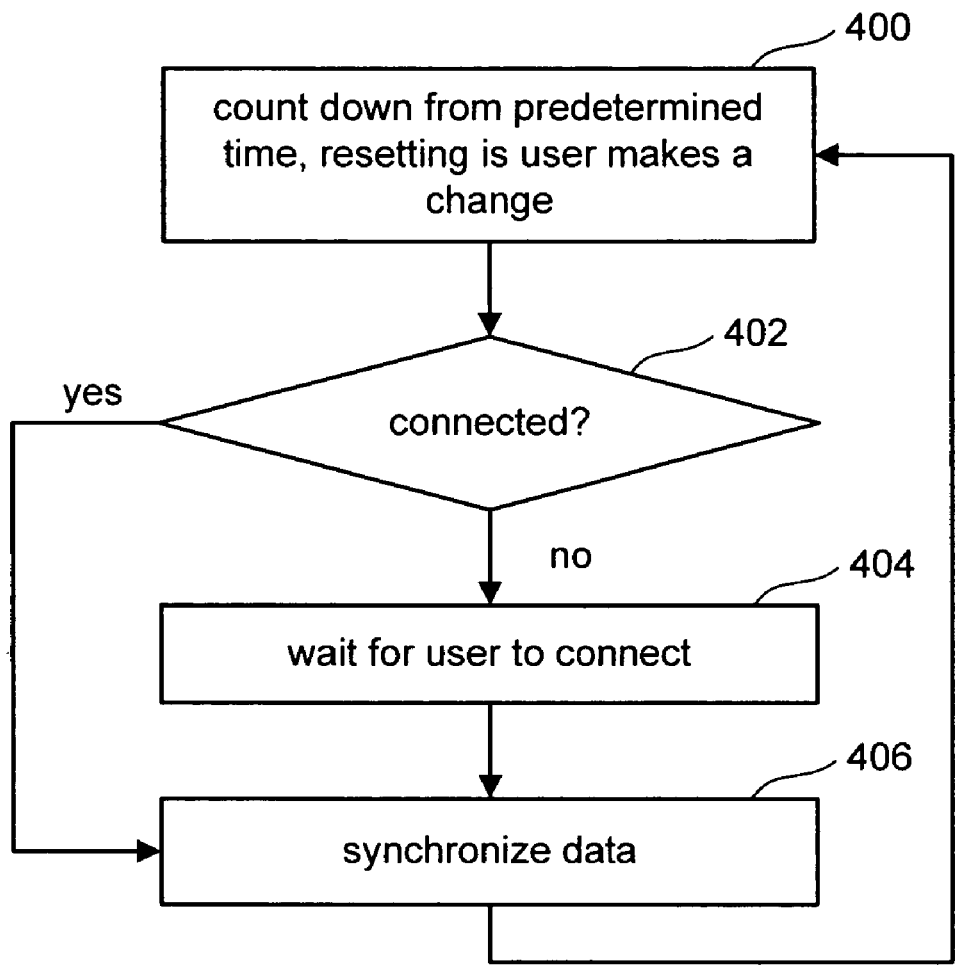
FIG. 9 is a flow chart describing one embodiment of a process for performing a repeating synchronization process.
FIG. 11 depicts a synchronization map.

FIG. 9 is a flow chart describing one embodiment of the repeating synchronization process (see step 376 of FIG. 8). The process of FIG. 9 is performed at the end of the process of FIG. 8. Additionally, after user is subscribed, every time the user logs into the computer or starts the computer the process of FIG. 9 will be performed. In step 400, a countdown timer is started for a predetermined time. In one embodiment, the countdown timer starts from two minutes and counts down to zero. If, the user changes any of the data for the project being shared (including adding data, deleting data, or modifying data) while the countdown timer is counting, then the countdown timer is reset back to two minutes. Note that in other embodiments, predetermined times other than two minutes can also be used. When the countdown timer has counted down to zero, Archive/Import/Synchronization Component 36 will perform a synchronization process as per the steps below. In step 402, after the countdown timer reached zero, it is determined whether the client is connected to File Server 20. In one embodiment, if the client is not connected, the system will automatically attempt to connect the client to File Server 20. Connecting to File Server 20 may require providing login credentials, which can be supplied manually by the user or automatically by the software. Alternatively, the user can be provided with a dialog box requesting that the user connect to the file server. If the client is not connected (or, in some embodiments, cannot be connected), the system will simply wait until the client becomes connected in step 404. After the client is connected, then synchronization will be performed in step 406. In some embodiments, if step 402 determines that the user is not connected, then the process loops back to step 400. If in step 402 it is determined that the client is connected, then the process continues at step 406 at which time the data is synchronized between Shared Data 22 and the local Database 34. After performing the synchronization process of step 406, the process loops back to step 400. In some implementations, a user can request that data be synchronized by using a menu or UI, rather than wait for the countdown timer.

Note the test for connection in step 402 can include determining whether the user is online to the appropriate network so the user can contact File Server 20. For example, if File Server 20 is accessed via the Internet, then the test being conducted will indicate whether the user is connected to the Internet and whether File Server 20 is reachable. It may be that the user is connected to the Internet, but File Server 20 is offline. In some cases, if a user is online, a filer server may need to be mounted.

Figure 10:
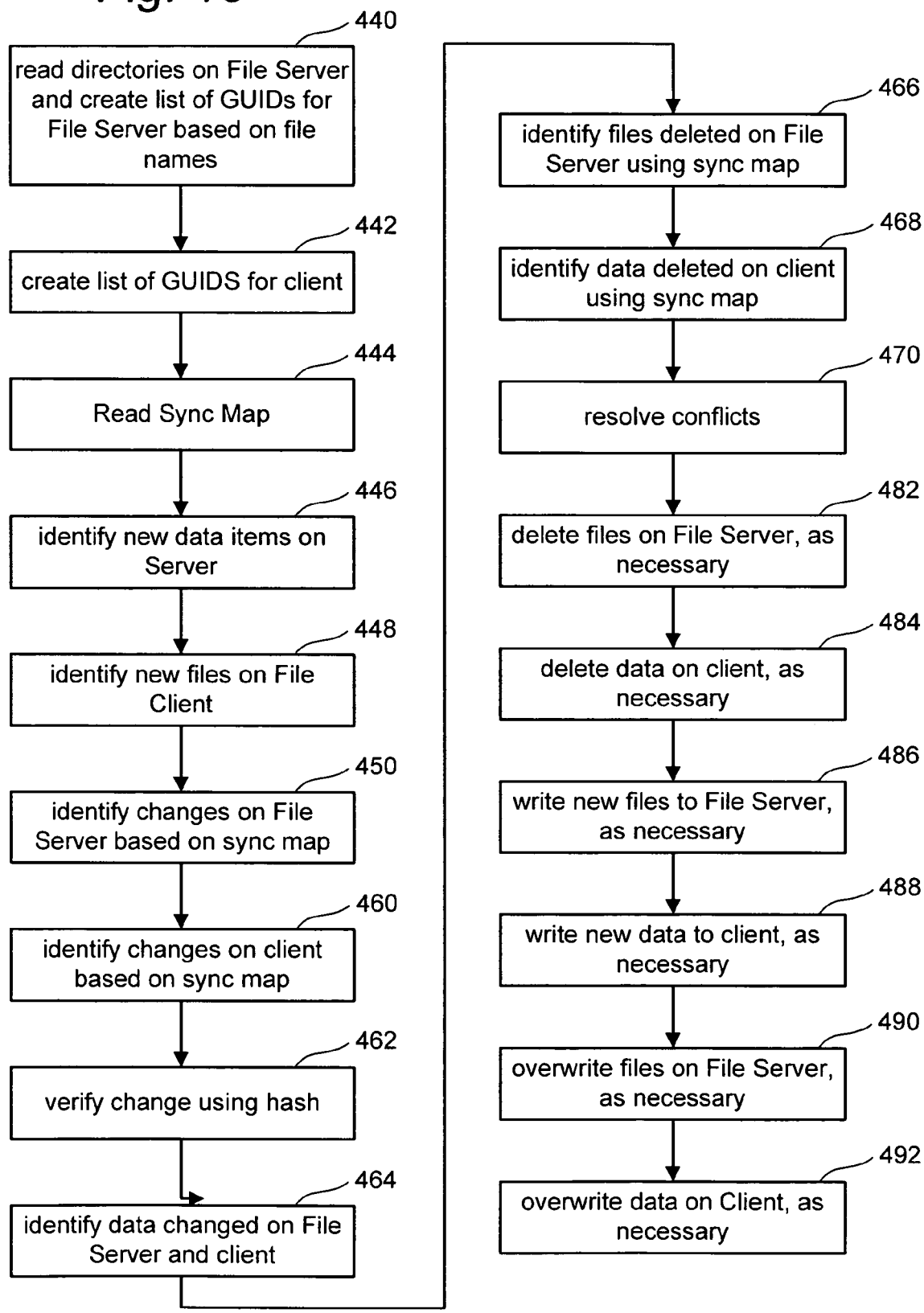
FIG. 10 is a flow chart describing one embodiment of a process for synchronizing data.

FIG. 10 depicts a flow chart describing one embodiment of the process for synchronizing data (see step 406 of FIG. 9). In one embodiment, the process of FIG. 10 is performed by Archive/Import/Synchronization Component 36. In other embodiments, other components can perform that process.

In step 440 of FIG. 10, the system will read the directories (see FIG. 2) for Shared Data 22 on File Server 20. This will include reading the file names and "Last Modified Dates" for each of the files, but will not include reading the internal contents of the files. Many operating systems will store the file names and the dates that the files were last modified as part of directory information. Reading the directory information is much faster than reading the contents of the files. Each of the file names are twenty six characters that represent encoding of the GUID for the data in the file. Based on reading the file names, the system can perform reverse encoding and create the 128 bit GUID. Thus, at the end step 440, the system has a list of GUIDs on the file server for Shared Data 22. In step 442, the system creates a list of GUIDs for data items stored on the client in Database 34 for that particular project.

In step 444, the Archive/Import/Synchronization Component 36 will read a local synchronization map. Each client will store and maintain a synchronization map used to help synchronize the Shared Data 22. In one embodiment, the synchronization map will include three fields for each record, and one record for each file synchronized in Shared Data 22. FIG. 11 provides an example of a portion of a synchronization map. The three fields include a GUID, a last synchronization date and a hash. The GUID identifies a GUID for the file in Shared Data 22. The last synchronization date corresponds to the data and time of the synchronization process that last changed the file on Filer Server 20. For each file stored in Shared Data 22, a hash will be created when that file is synchronized. There are various means acceptable for creating a hash. One example is to create a 32 bit Cyclic Redundancy Code (CRC) of the relevant data within the file stored on File Server 20.

In step 446 of FIG. 10, the system will identify all new files on File Server 20. Any GUID read in step 440 that does not exist in the synchronization map represents a file that was created since the last synchronization. Thus, that file is a new file on File Server 20. In step 448, the system identifies new data items in the client. Any GUID identified in step 442 that is not found in the synchronization map represents a new data item on the client that was created after the last synchronization.

In step 450, the system will identify changes on File Server 20. That is, any file on the file server that has a last modified date later than the last synchronization date from the synchronization map is assumed to have been changed on the file server. In step 460, the system identifies change on the client based on the synchronization map. That is, any data item that has a last modified date on the client which is later than the corresponding last synchronization date from the synchronization map is considered to be changed on the client. In step 462, any data that appears to be changed on the client is verified to have been changed using the hash. That is, it is possible that a last modified date can be updated by touching the data in a way that does not change any relevant data. For example, if a particular task item or calendar appointment are opened and saved without saving the data, the last modified date may be updated. Additionally, other data that is not shared can be changed. By taking a hash of the data on the client and comparing it to the hash in the synchronization map, it can be determined whether there was an actual and relevant change. For those data items that match the hash, they will not be marked as changed on the client. In step 464, the system identifies which data items have been changed both on the client and the file server. Files changed on both give rise to a conflict.

In step 466, the step identifies files that were deleted on the file server using the synchronization map. That is, any GUID that exist in the synchronization map but does not exist on File Server 20 is assumed to have been deleted on the File Server 20. In step 468, the system identifies data that has been deleted from the client using the synchronization map. Any GUID that exists in the synchronization map but does not exist in Database 34 is assumed to be deleted on the client. Additionally, the system notes whether a file was deleted on the client or filer server, while modified on the other. If so, there is a conflict.

In step 470, the conflicts are resolved. If a file has been changed on both the client and the file server, there is a conflict. Similarly, if the file was deleted on one and changed on the other, there is a conflict. There are various means for resolving conflicts that can be used within the present invention. No particular conflict resolution process is required to practice the present invention. In one embodiment, the system can automatically resolve the conflicts by choosing data on the file server, choosing data on the client or choosing the latest modified data. In other embodiments, conflicts can be resolved by providing a dialog box to the user and requesting that the user select which data to use. Based on the conflict resolution process, some of the files will be marked for deletion and others will be marked for overwriting. In other embodiments, the conflict resolution process can be performed on a field-by-field basis within files, rather than a file-by-file basis.

In step 482, appropriate files are deleted from the file server. For example, data items that have been deleted on the client and not modified on File Server 20 will cause the appropriate files on File Server 20 to be deleted. Additionally, the conflict resolution process may determine that certain files should be deleted. In step 484, appropriate data items on the client are deleted. For example, if a file has been deleted on File Server 20 and not modified on the client, the appropriate data on the client will be deleted. If the file was deleted on File Server 20 and modified on the client, then conflict resolution process may determine to delete the data on the client.

In step 486, appropriate new files are written to File Server 20. For each new data item on the client, an appropriate data file will be written to File Server 20. In step 488, new data items are stored on the client. These new data items correspond to new files on File Server 20.

In step 490, certain files are overwritten on File Server 20 with data from the client. For example, if data was changed on the client but not on File Server 20, the data on File Server 20 will be overwritten with the data from the client. If data changed on both the client and File Server 20, and the conflict resolution process determined to use the data from the client, then the data on the client will be used to overwrite the data on File Server 20. In step 492, certain data items on the client will be overwritten with data from File Server 20. For example, if a file on File Server 20 was changed and the data on the client was not changed, the data from File Server 20 will be used to overwrite the data on the client. If the data on the client and File Server 20 both changed, and the conflict resolution process chose to use the data from File Server 20, then the data from File Server 20 will be used to overwrite the data from the client.

In some embodiments, the meta data can also be synchronized. This includes synchronizing all the meta data or a subset of the meta data. For example, in some implementations, the GUID will not be synchronized, however, the Category Name, Project Name, Project Comments, Project Color, and Date can all be synchronized. In some embodiments, Project Comments will not be synchronized and/or not shared.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for sharing data among multiple users working on the same project, each user accessing the data via a client device, comprising:

providing a storage device containing at least one project folder, wherein the storage device is accessible via a first client device and a second client device;

exporting data items stored on the first client device in a first application format from the first client device to a project folder in the storage device, wherein a first user generated the data items being exported;

converting each data item in the first application format exported to the project folder in the storage device to a standard format file containing the data item, each standard format file having a file name based on a unique identifier associated with the data item, said converting includes storing each data item in a separate file in the project folder in said storage device;

downloading a local copy of said standard format files onto the second client device, wherein the local copy of said standard format files downloaded onto the second client device are converted back into the data items in the first application format so that a second user working on said second client device can modify the data items;

modifying at least one data item of the local copy of said data items downloaded onto the second client device; and synchronizing said local copy of said data items in said first application format on said second client device with said standard format files stored in the project folder on said storage device to ensure that any data items modified by said second user in said local copy of said data items maintained on the second client device are also modified in the storage device, the step of synchronizing including:

reading the file name and a last modified date of each standard format file in the project folder;

identifying each modified data item stored on the second client device associated with the project folder;

reading a last modified date of each modified data item identified on the second client device associated with the project;

identifying conflicts between a modified data item stored on the second client device and a corresponding standard format file stored in the storage device by comparing the last modified date of a data item against the last modified date of the corresponding standard format file; and resolving each identified conflict by overwriting the standard format file in the project folder with the corresponding modified data item.

2. A method according to claim 1, wherein:

said storage device is a file server; and said method further comprises managing access control of said standard format files on said file server using a standard access control mechanism for said file server.

3. A method according to claim 1, wherein:

said file names are created by encoding said unique identifiers.

4. A method according to claim 1, wherein said step of converting is performed by the first client device and comprises the steps of:

creating a first folder for storing meta data and subfolders;

creating a subfolder for each type of data item; and storing standard format files in appropriate subfolders based on type of data item.

5. A method according to claim 1, wherein:

said storage device is a file server;

said first client device and said second client device are remote from said file server;

said first client device and said second client device are computing devices that communicate with said file server using a network; and said first application format is a personal information management program.

6. The method according to claim 1, wherein the data items are contacts, the step of converting each data item in the first application format exported to the storage device to a standard format file associated with the data item comprises the steps of:

converting each contact in a first application format to a contact in a vCard format; and storing each contact in a vCard format in a separate file in the project folder.

7. The method according to claim 1, wherein the data items are calendar appointments, the step of converting each data item in the first application format exported to the storage device to a standard format file associated with the data item comprises the steps of:

converting each calendar appointment in a first application format to a calendar appointment in an iCal format; and storing each calendar appointment in an iCal format in a separate file in the project folder.

8. The method according to claim 1, wherein the data items are messages, the step of converting each data item in the first application format exported to the storage device to a standard format file associated with the data item comprises the steps of:

converting each message in a first application format to a message in an in-box format; and storing each message in an in-box format in a separate file in the project folder.

* * * * *

UNITED STATES PATENT AND TRADEMARK OFFICE
CERTIFICATE OF CORRECTION

PATENT NO. : 7,660,809 B2  Page 1 of 1
APPLICATION NO. : 11/048447
DATED : February 9, 2010
INVENTOR(S) : Cortright et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this

Thirtieth Day of November, 2010

David J. Kappos
*Director of the United States Patent and Trademark Office*